USOO5694502A

United States Patent [19]
Byron

[11] Patent Number: 5,694,502
[45] Date of Patent: Dec. 2, 1997

[54] BRAGG GRATINGS IN WAVEGUIDES

[75] Inventor: Kevin Christopher Byron, Bishop's Stortford, United Kingdom

[73] Assignee: Northern Telecom Limited, Montreal, Canada

[21] Appl. No.: 667,046

[22] Filed: Jun. 20, 1996

[30] Foreign Application Priority Data

Jun. 20, 1995 [GB] United Kingdom ............... 9512547

[51] Int. Cl.$^6$ ............................................. G02B 6/34
[52] U.S. Cl. .................................................. 385/37
[58] Field of Search ....................... 385/37; 359/566–576

[56] References Cited

U.S. PATENT DOCUMENTS

| 5,327,515 | 7/1994 | Anderson et al. | 385/123 |
| 5,495,548 | 2/1996 | Bilodeau et al. | 385/123 |

FOREIGN PATENT DOCUMENTS 2 275 350  8/1994  United Kingdom.

OTHER PUBLICATIONS

Meltz, "Bragg grating formation and germanosilicate fiber photosensitivity" Int'l Workshop of Photoinduced Self–Organization Effects in Optical Fiber, SPIE, vol. 1516, 1991, pp. 185–199.

Rourke, "Fabrication and characterisation of long, narrow-band fibre gratings by phase mark scanning", Electronics Letters, vol. 30, No. 16, Aug. 4, 1994, pp. 1341–1342.

Primary Examiner—John D. Lee
Assistant Examiner—Ellen Eunjoo Kang
Attorney, Agent, or Firm—Lee, Mann, Smith, McWilliams, Sweeney & Ohlson

[57] ABSTRACT

A method of generating a Bragg reflective grating in a photosensitive optical waveguide using a fringe pattern of electromagnetic radiation additionally employs a further beam of radiation to promote differential heating of the fibre in the region where the grating is being generated. The differential heating produces differential photo-sensitivity of the fibre so that the resulting grating, though it has a constant physical pitch, has an effective optical pitch that is a function of position along the length of the grating.

5 Claims, 1 Drawing Sheet

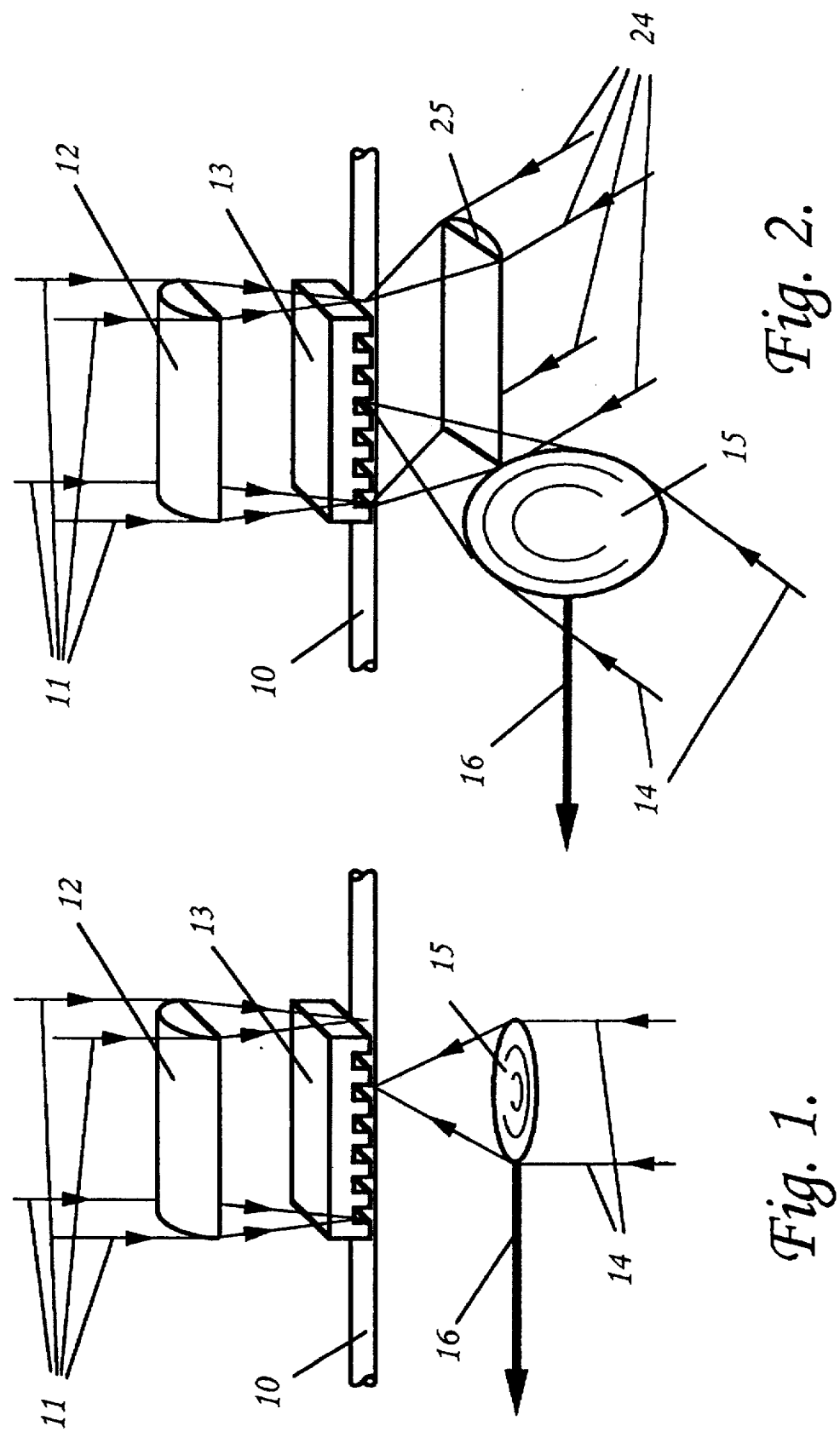

BRAGG GRATINGS IN WAVEGUIDES

BACKGROUND TO THE INVENTION

This invention relates to the creation of Bragg reflective gratings in photosensitive optical waveguide, and in particular to the creation of such gratings in forms exhibiting chirp or apodisation.

A method of providing such shading, chirp or apodisation is described by H N Rourke et al in a paper entitled 'Fabrication and Characterisation of Long, Narrow-Band Fibre Gratings by Phase Mask Scanning', Electronics Letters (4 Aug. 12994) Vol. 30, No. 16 pp 1341-2. In that instance the Bragg grating is created in an optical fibre by lateral exposure of the fibre to ultra-violet light through a phase grating mask. The ultra violet light is scanned across the mask in the axial direction of the fibre, and it is explained that, by appropriate programming of the speed of the scan, the exposure time can be tailored to a particular function of position along the length of the developed Bragg grating.

SUMMARY OF THE INVENTION

The present invention is directed to an alternative method of pitch tailoring, in particular a method that enhances overall photosensitivity and can provide high spatial resolution of tailoring.

According to the present invention there is provided a method of creating a Bragg reflection grating in a length of photosensitive optical waveguide by lateral illumination of the waveguide with a fringe pattern of electromagnetic radiation, in the course of which grating creation the length of the waveguide in which the grating is being created is differentially heated by radiation providing a heat flux that is functionally dependent upon position along the length of the grating.

A convenient way of providing the differential heating is to track a focused beam of radiation along the Bragg grating as it is being created.

BRIEF DESCRIPTION OF THE DRAWINGS

There follows a description of the creation of a Bragg reflective gratings in lengths of photosensitive optical fibre by methods embodying the invention in preferred forms.

The description refers to the accompanying drawings in which FIGS. 1 and 2 are schematic perspective views of alternative versions of apparatus employed to create gratings by methods embodying the invention in preferred forms.

DETAILED DESCRIPTION OF PREFERRED EMBODIMENTS

Referring to FIG. 1, to form a Bragg reflective grating in a length of photosensitive optical fibre waveguide 10, a collimated beam of ultra-violet light 11 for instance from a frequency doubled argon ion laser, (not shown), is incident upon a cylindrical lens 12 which focuses the light into a line extending substantially along the axis of the fibre 10. Adjacent the fibre 10 is a phase grating 13 which interacts with the incident light to form a fringe pattern of light in the optical core of the optical fibre 10. If desired, the spacing of the phase grating from the fibre may be modulated during the creation of the Bragg grating after the manner described in the specification of patent application Ser. No. 9410545.9.

In the course of the creation of the Bragg grating in the fibre 10, that fibre is subjected to differential heating which serves to tailor the effective optical pitch (a product of the physical pitch of the grating with the local effective refractive index of the fibre) of the Bragg grating as the consequence of the fact that the photo-sensitivity of photosensitive optical fibre is temperature dependent. Differential heating of the fibre 10 in the region in which the grating is being created is provided by tracking, in the axial direction of the fibre, a beam of radiation 14, for instance from a $CO_2$ laser (not shown), focused by a lens 15 to a point in the core of the fibre 10. (The direction of tracking is indicated by arrow 16.)

The total heat flux received by any point of the core, and hence the temperature it attains, is determined by the intensity of the beam 14 and its dwell time, either or both of which can be independently varied as the tracking proceeds.

The apparatus of FIG. 2 contains the same components as that of FIG. 1, but additionally includes a further beam of radiation 24, which may similarly be from a $CO_2$ laser (not shown), focused by a cylindrical lens 25 to a line focus extending along the core of the fibre 10. This further beam of radiation is employed to raise the temperature of the fibre uniformly, and thus enhance its photosensitivity by a uniform amount upon which is superimposed the non-uniform enhancement provided by beam 14.

The use of a $CO_2$ laser radiation for heating the fibre provides the advantage of overall increased photosensitivity and, given that a $CO_2$ laser spot can be focused to a few µm, high spacial resolution of apodisation of the resulting Bragg grating can be obtained.

Though the foregoing specific description has related to Bragg grating creation using a phase mask, it should be understood that the invention is applicable also to Bragg grating creation using two-beam holography to generate the requisite fringe pattern.

I claim:

1. A method of creating, in a length of photosensitive optical waveguide, a Bragg reflection grating by lateral illumination of the waveguide with a fringe pattern of electromagnetic radiation, wherein, concurrently with at least a portion of said lateral illumination of the waveguide with a fringe pattern to create therein a Bragg reflection grating, the length of the waveguide in which the grating is being created is differentially heated by radiation providing a heat flux that is functionally dependent upon position along the length of the grating.

2. A method as claimed in claim 1, wherein the differential heating is provided by a focused beam of radiation traversed along the length of the grating.

3. A method as claimed in claim 2, wherein the rate of tranverse is varied during the traversal.

4. A method of creating, in a length of photosensitive optical waveguide, a Bragg reflection grating by lateral illumination of the waveguide with a fringe pattern of electromagnetic radiation, in the course of which grating creation the length of the waveguide in which the grating is being created is differentially heated by radiation providing a heat flux that is functionally dependent upon position along the length of the grating, wherein the differential heating is provided by a focused beam of radiation traversed along the length of the grating, and wherein the optical power of the focused beam is varied during the traversal.

5. A method of creating, in a length of photosensitive optical waveguide, a Bragg reflection grating by lateral illumination of the waveguide with a fringe pattern of electromagnetic radiation, in the course of which grating creation the length of the waveguide in which the grating is being created is differentially heated by radiation providing a heat flux that is functionally dependent upon position along the length of the grating, wherein the differential heating is provided by a focused beam of radiation traversed along the length of the grating, and wherein during the traversal an additional heating source is employed to flood the grating with heating radiation.

* * * * *